(No Model.)
D. HAZARD.
DEVICE FOR SWAGING SAW TEETH.
No. 529,860. Patented Nov. 27, 1894.
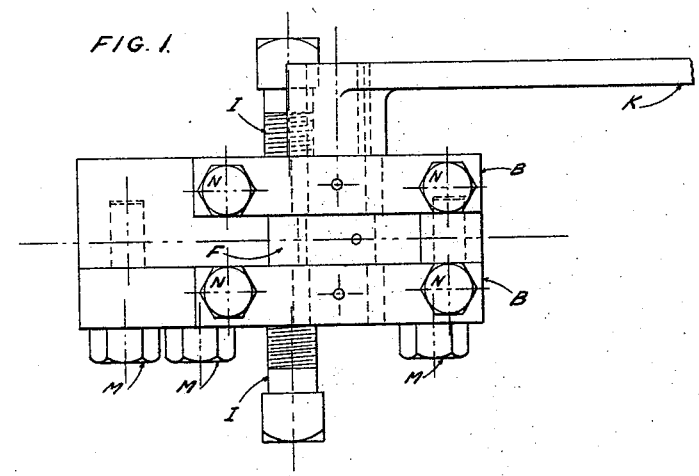
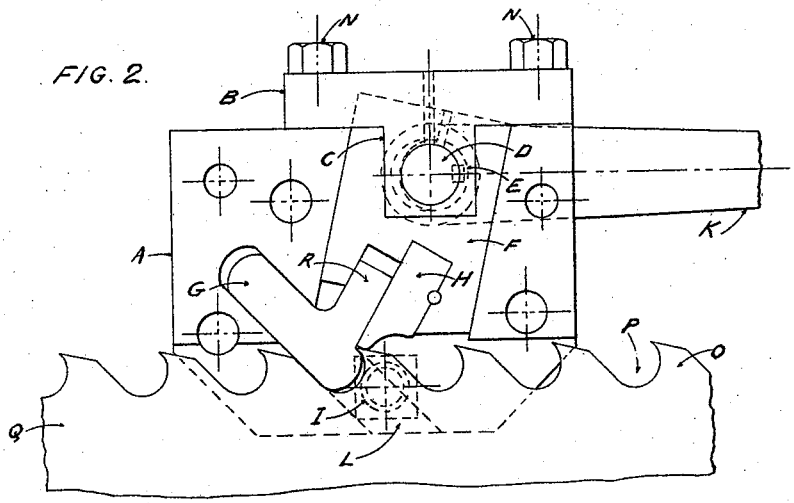
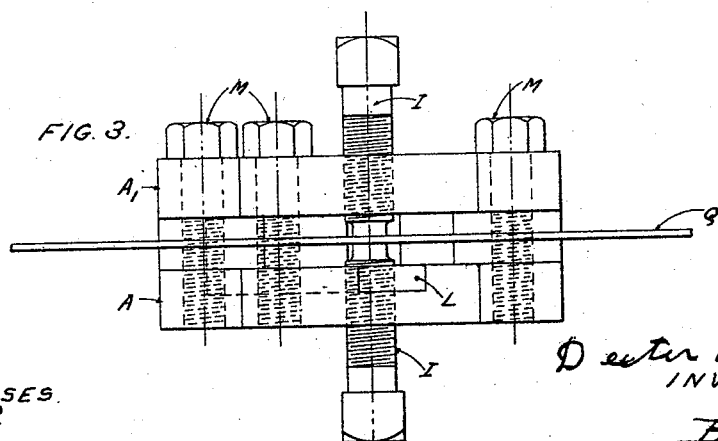
WITNESSES
Dexter Hazard
INVENTOR
By
Cleland and Pearl
ATTORNEYS

UNITED STATES PATENT OFFICE.

DEXTER HAZARD, OF MARQUETTE, MICHIGAN, ASSIGNOR OF ONE-HALF TO FREDERICK O. CLARK, OF SAME PLACE.

DEVICE FOR SWAGING SAW-TEETH.

SPECIFICATION forming part of Letters Patent No. 529,860, dated November 27, 1894.

Application filed April 21, 1894. Serial No. 508,545. (No model.)

*To all whom it may concern:*

Be it known that I, DEXTER HAZARD, of Marquette, in the county of Marquette and State of Michigan, have invented a new, novel, and Improved Device for Swaging Saw-Teeth, of which the following is a specification.

This applies to solid saws constructed in accordance with my Patent No. 486,226, and my invention shown in my application, Serial No. 496,913, filed in the United States Patent Office January 15, 1894.

My invention has for its object the production of a mechanism for up-setting and spreading the points of solid saw teeth, and for regulating the distance between the backs and points of the same.

In the drawings, Figure 1 is a top view of my invention. Fig. 2 is a side view of my invention, with one side piece removed, showing a section of the saw adjusted to the anvil of the swage. Fig. 3 is a view of the bottom of my invention, with a section of the saw adjusted between the set pins which hold the saw in position.

A and A' are the side pieces which form the body of my device.

I are set screws which hold the saw in position, after the tooth has been adjusted to the anvil of the swage.

G is the anvil having projection R, which is to upset the point of the tooth.

H is the punch that flattens and spreads the point of the tooth.

F is a piece of steel which holds R and H in position, and operates them.

E is the eccentric which moves F up and down.

D is a round pin which holds the eccentric E in position. D and E are one piece of material.

B are boxes which hold the pins D and eccentric E in position.

N are tap-screws which hold the boxes B to the side pieces A and A'.

K is a lever, which operates the eccentric E.

M are tap-bolts, which hold the side pieces A and A' together. A is provided with a slot corresponding to the size of anvil G; also a slot corresponding to the size of F. F is pro- vided with a slot, which corresponds to the size of H and R. This slot in which R and H are located has a draft of one-eighth of an inch. As F moves upward and downward, the draft in this slot in which H and R are located gives R a lateral motion to that of F. As F moves upward, anvil G, having projection R, moves backward, and H rises upward with F. Then, as the tooth is adjusted against the projection R of anvil G, the set screws I are tightened against the side of the tooth, which prevents it moving. Then, as the lever K is brought forward, the eccentric E forces F downward when the draft in the slot in which projection R of anvil G is located, will cause said projection R to move forward against the point of the tooth.

The purpose of projection R of anvil G is to upset the fine delicate point of the tooth. Then, as H comes in contact with the back of the tooth, it will be apparent how this mechanism will spread the point of the tooth as desired. P is a semi-circular throat between the back and point of the teeth, according to my Patent No. 486,226, and my invention contained in Serial No. 496,913, above referred to. The anvil G is of uniform size, to correspond with said circular throat P. The purpose of having anvil G of corresponding size to the space P is to leave all the points of the teeth when swaged at a uniform distance from the back of the preceding tooth, and make the face line of the point of the tooth, which rests upon G, parallel with the tangents forming the back of the teeth. By placing the bottom of the anvil G against the back of the tooth opposite the point to be swaged, when the punch H comes in contact with the tooth to be swaged, it will invariably press the point downward until the point has a bearing upon the top of anvil G, which will provide the tooth with square projecting corners, as desired, as projection R of anvil G has a square face and prevents the point of the tooth from drawing forward.

Q is a section of the saw provided with teeth of my invention, Serial No. 496,913, above referred to. There is no device now in use for swaging teeth formed, as appears in my said Patent No. 486,226, and my said invention, Serial No. 496,913, within my knowledge, so as to properly upset and swage the points and regulate the distance between the points and backs of the teeth, as above described. This I say, after twenty years of practical experience in the art of fitting saws.

What I claim is—

In a device for swaging the points of solid saw teeth and for regulating the distance between the backs and points of said teeth, the combination with inclosing side pieces A and A', provided with set screws I; inclosing anvil G, having projection R; punch H; slide F; and pin D, provided with eccentric E, in connection with boxes B and lever K; all substantially as shown and described.

Dated April 16, 1894.

DEXTER HAZARD.

In presence of—
FRANK PENDILL,
FRED A. HOPE.